J. H. GILLISPIE & J. L. COBERLY.
AUTOMATIC CUT-OFF.
APPLICATION FILED MAY 21, 1912.

1,060,336.

Patented Apr. 29, 1913.

Inventors
J. H. Gillispie.
J. L. Coberly.

Witnesses

By _____, Attorneys.

UNITED STATES PATENT OFFICE.

JAMES H. GILLISPIE AND JESSE L. COBERLY, OF BURNSVILLE, WEST VIRGINIA.

AUTOMATIC CUT-OFF.

1,060,336. Specification of Letters Patent. Patented Apr. 29, 1913.

Application filed May 21, 1912. Serial No. 698,803.

*To all whom it may concern:*

Be it known that we, JAMES H. GILLISPIE and JESSE L. COBERLY, citizens of the United States, residing at Burnsville, in the county of Braxton and State of West Virginia, have invented certain new and useful Improvements in Automatic Cut-Offs, of which the following is a specification.

Our invention is an automatic cut-off having for its object the provision of a simple and efficient device for use upon gas service pipes whereby the admission of gas to a dwelling, after the supply has been arrested by freezing or other causes, is prevented. It frequently happens in severe weather that the gas in the service pipes becomes frozen, so that it will not flow, or if it flows at all, will be under very light pressure. Under these conditions, it frequently happens that gas cocks within the house are unknowingly left open and when the gas again starts to flow it will escape through an opened cock and cause considerable damage. The use of our device will effectually prevent the gas entering the house after a stoppage of the character noted until the owner or occupant of the house has had an opportunity to close all stopcocks, and thereby prevent the escape of the gas.

An embodiment of our invention is illustrated in the accompanying drawings which are to be taken as a part hereof, and the invention consisting in certain novel features of construction and arrangement will be hereinafter first fully described and then more particularly pointed out in the claims following the description.

Figure 1:
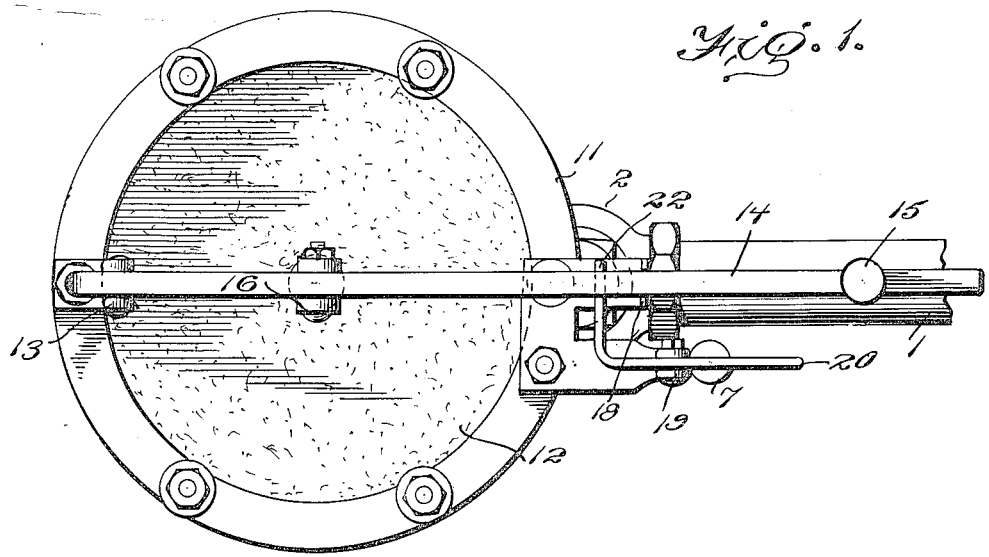
Figure 2:
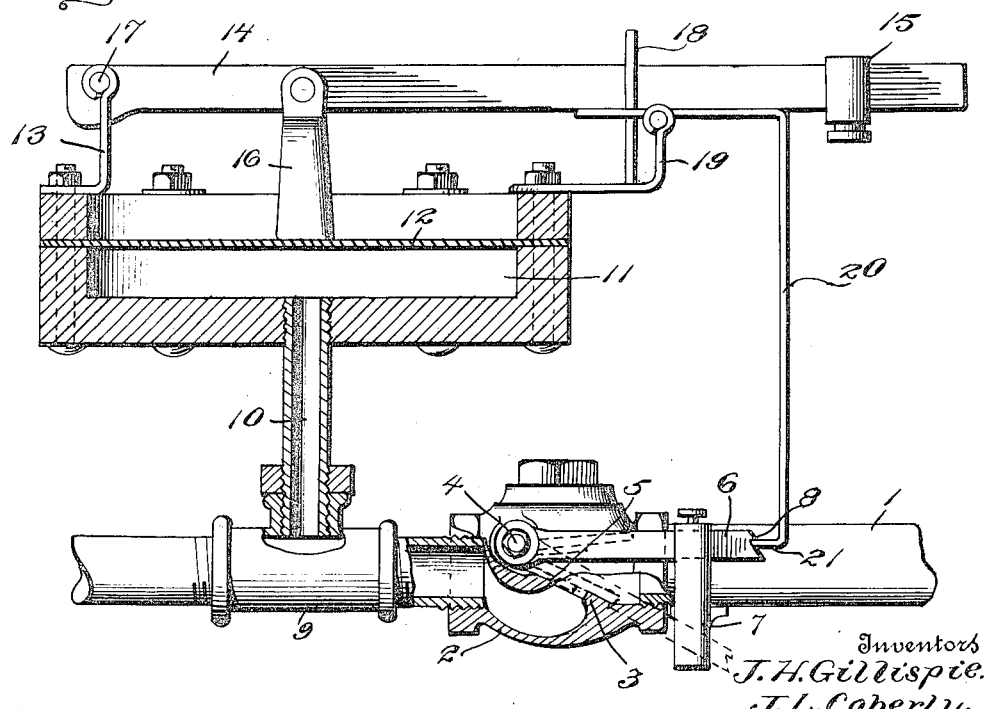

In the drawings:—Figure 1 is a plan view of our improved cut-off; and Fig. 2 is a sectional elevation of the same.

In carrying out our invention, we interpose in the service pipe 1 a valve casing 2 having an internal ported partition 3 constituting a valve seat. Mounted transversely in the said casing, above and adjacent the said partition, is a rotary valve stem 4 having a flap valve 5 rigidly secured thereon, the said valve being adapted to seat against the partition 3 and cover the port therein, so as to prevent the flow of gas through the same. The valve stem 4 is equipped at one end with an arm 6 upon which is secured a weight 7 and which is provided in its outer free end with a small notch or shoulder 8. Between the house and the valve casing 2 a T-coupling or elbow 9 is interposed in the service pipe and from the said coupling rises a branch 10 upon the upper end of which is secured a hollow body or drum 11 containing a flexible diaphragm 12 which may be of thin flexible metal, or may be of rubber or other elastic material reinforced at its center by a wear plate. Upon the drum 11, at one side thereof, we secure a bracket or short standard 13 in which is fulcrumed a lever 14 extending across the drum and projecting beyond the opposite side thereof, a weight 15 being fitted on the free end of this lever, as clearly shown. Pivoted to the said lever 14 and depending therefrom so as to rest on the diaphragm 12, at the center of the same, is a pendant foot or support 16 which bears upon the diaphragm, so as to transmit the weight of the lever thereto and cause the lever to move up and down about its pivotal connection 17 with the bracket 13, as the pressure below the diaphragm decreases. Upon the drum 11, at a point diametrically opposite the bracket 13, we secure a guide 18 which engages the lever 14, so as to prevent lateral movement thereof, and the said guide 18 is preferably formed integral with a post or bracket 19 in which is pivotally mounted a trigger or trip 20. This trigger or trip 20 may be conveniently formed from a stout wire bent to extend outwardly from its pivotal connection with the bracket or post 19 and then downwardly to a point adjacent the arm 6 where its lower extremity will be bent toward the said arm to form a lip 21 adapted to engage the notch or shoulder 8 at the end of the said arm, as shown in Fig. 2 and as will be readily understood. The upper portion of this trip or trigger extends inwardly from the post or bracket 19 toward the drum and is then bent laterally to present an arm 22 extending under the lever 14, as clearly shown.

The construction and arrangement of the several parts of the device being thus made known, it is thought the operation and advantages of the same will be readily understood and appreciated. The gas, under ordinary conditions, flows through the port in the partition 3 and enters the building, a portion of the gas passing upwardly into the drum 11 where it collects below the diaphragm 12 and consequently exerts a pressure thereon which will tend to elevate the lever 14, so that the trigger 20 will, of its own weight, swing toward the arm 6 and engage the notch in the end thereof to hold the valve 5 in its open position.

Should the flow of gas be cut off from some cause exterior to the building, the pressure will drop, and consequently the weight of the lever 14 acting through the foot 16 upon the diaphragm 12 will overcome the reduced pressure below the diaphragm, so that the lever will swing downwardly and consequently bear upon the arm 22 of the trigger, whereby the said trigger will be swung upon its pivotal support and the lower end of the same carried away from and out of engagement with the end of the arm 6, whereupon the said arm will at once drop and rotate the valve stem 4, so that the valve 5 will be seated upon the partition 3 and cover the port therein to prevent any further inflow through the service pipe. It will thus be readily seen that when the difficulty in the service pipe or in the main has been overcome and the gas again starts to flow, it will be unable to pass through the valve casing 2, as the valve 5 effectually cuts off and prevents the flow through the port in said casing. The occupant of the building will consequently be put on his guard and as it will be necessary for him to manually move the valve 3 to its open position he will, of course, first examine all the stopcocks within the dwelling to see that they are closed, and escape of the gas prevented. To permit the gas to again flow into the building it is necessary to raise the arm 6 and engage the end of the same over the lip 21 of the trigger 20, whereupon the valve will be moved to open position and will be held in that position by the pressure of the gas which at once resumes its flow through the service pipe and enters the drum 11 to bear upon the diaphragm 12 and raise the lever 14, as before.

It will be readily understood that the weights 7 and 15 may be adjusted so as to regulate the pressure of gas under which the device will operate, and if the conditions are such that shorter levers or arms are desirable and the weights cannot be conveniently employed, springs having any desired tensile strength may be substituted for the weights.

Our device is obviously simple in its construction and arrangement of its parts and will be found highly efficient for the purposes for which it is designed.

Having thus described our invention, what we claim as new, is:—

1. The combination with a service pipe, and a valve disposed therein, of a pressure-controlled device communicating with the service pipe and comprising a flexible diaphragm, a lever fulcrumed at one end at one side of said device and extending over the same and supported between its ends by said diaphragm, and a trigger fulcrumed below said lever at the opposite side of the pressure-controlled device and having its upper end extending beneath the free end of the lever and its lower end releasably connected with the valve in the service pipe.

2. The combination of a service pipe, a valve therein having a rotary valve stem, an arm rigid with one end of said valve stem, a pressure-controlled device communicating with the service pipe, a lever fulcrumed at one side of the pressure-controlled device and extending across and connected with the same to be operated thereby, and a trigger mounted adjacent the pressure-controlled device and having a lateral arm at its upper end extending under and supporting the free end of said lever and having a depending portion provided at its lower end with a terminal lip engaging the end of the arm of the rotary valve stem.

3. The combination of a service pipe, a valve therein having a rotary valve stem, an arm rigid with one end of said valve stem and provided with a notch in its free end, a pressure-controlled device communicating with the service pipe and comprising a hollow body, a bracket erected on said body at one side thereof, a guide upon the body at the opposite side thereof, a lever fulcrumed at one end of said bracket and extending through the said guide and connected between the bracket and the guide with the pressure-controlled device, a standard adjacent said guide, and a trigger fulcrumed on said standard and having its upper end provided with a lateral arm extending under the lever and having a depending portion provided with a terminal lip adapted to engage the notch in the end of the arm on the rotary valve stem.

In testimony whereof we affix our signatures in presence of two witnesses.

JAMES H. GILLISPIE. [L. S.]
JESSE L. COBERLY. [L. S.]

Witnesses:
JASON HYRE,
T. M. MORAN.